United States Patent Office 3,151,997
Patented Oct. 6, 1964

3,151,997
SEPARATING-MEDIUM COATING FOR PREPARATION OF ELECTRICAL STEEL STRIP FOR ANNEALING
Mahlon A. Harvey, Monroeville, Pa., assignor to United States Steel Corporation, a corporation of New Jersey
No Drawing. Filed Sept. 29, 1961, Ser. No. 141,613
10 Claims. (Cl. 106—286)

This invention relates to coatings for steel and, more particularly, to separating-medium coatings for electric steel strip and their application preparatory to annealing.

In the manufacture of steel strip to be used for the laminated cores of electrical equipment, it is necessary to provide an insulation coating on the surfaces of the strip to reduce eddy currents. Conventionally a strip of steel is processed which is later cut to desired lengths for core laminations. During the processing of the strip, the insulation coatings are applied. Normally, two separate insulation coatings are provided. The first coating is known as a separating-medium coating, and the second is known as a core-plate coating. This invention relates to the former.

Separating-medium coatings of MgO slurry have conventionally been applied to the coil before it is box annealed at a temperature which is usually between 1800° F. and 2200° F. The primary function of the separating-medium coating is to prevent adhesion of adjacent wraps of the coil during box annealing. If adjacent surfaces of the steel are not properly coated they will weld together during annealing. Therefore, good adherence of the coating to the steel is required. During this annealing, the high temperature causes a reaction between the separating-medium coating and the strip to form a glass-like coating of iron-magnesium-silicate on the surface of the strip. This coating is a non-conductor of electricity and hence performs a secondary function of providing some insulation. For some applications the separating-medium coating provides all of the insulation necessary. Normally, however, the separating-medium coating is supplemented by applying a core-plate coating after annealing.

It is a principal object of this invention to provide a separating-medium coating which has improved adherence and electrical insulation properties.

Other objects will appear and a fuller understanding of the invention may be had by reference to the following description and claims.

I have found that the combination of magnesium oxide with aluminum hydroxide, colloidal boehmite (AlO(OH)) alumina or aluminum acetate or combinations thereof in a water slurry produces a superior separating-medium coating. The magnesium oxide must be finely divided reactive grade MgO and the weight percentage thereof should be between 3.0% and 10.5% and preferably between 4.5% and 7%. Although the amount of aluminum hydroxide or colloidal boehmite (AlO(OH)) alumina or aluminum acetate can vary considerably, I prefer between .03% and 1.5% thereof. Even more preferable is between .1% and .3% of aluminum hydroxide or colloidal boehmite (AlO(OH)) alumina and between .25% and .5% of aluminum acetate.

The exact amount of these aluminum bearing materials should be based on two considerations: First, the slurry should have the proper consistency for spreading on steel; and second, the aluminum bearing material should not be present in great enough quantity to prevent the formation of a stable iron-magnesium-silicate glass during annealing.

Further, I have found that when aluminum hydroxide or colloidal boehmite (AlO(OH)) alumina or mixtures thereof are used the addition of an effective amount up to 2% of acetic acid improves the adherence characteristics of the coating.

Several examples of coatings made according to this invention are given below:

EXAMPLE I

|  | Percent (by weight) |
|---|---|
| MgO | 6.25 |
| $CH_3COOH$ | .01 |
| AlO(OH) | .16 |
| $H_2O$ and residual impurities | Bal. |

EXAMPLE II

|  | Percent (by weight) |
|---|---|
| MgO | 7.09 |
| $CH_3COOH$ | 1.3 |
| $Al(OH)_3$ | .19 |
| $H_2O$ and residual impurities | Bal. |

EXAMPLE III

|  | Percent (by weight) |
|---|---|
| MgO | 4.8 |
| AlO(OH) | .17 |
| $CH_3COOH$ | .45 |
| $H_2O$ and residual impurities | Bal. |

EXAMPLE IV

|  | Percent (by weight) |
|---|---|
| MgO | 4.8 |
| $Al(OH)_3$ | .2 |
| AlO(OH) | .18 |
| $H_2O$ and residual impurities | Bal. |

EXAMPLE V

|  | Percent (by weight) |
|---|---|
| MgO | 4.8 |
| AlO(OH) | .09 |
| $Al(OH)_3$ | .10 |
| $CH_3COOH$ | .44 |
| $H_2O$ and residual impurities | Bal. |

EXAMPLE VI

|  | Percent (by weight) |
|---|---|
| MgO | 4.8 |
| $Al(CH_3COO)_3$ | .42 |
| $H_2O$ and residual impurities | Bal. |

Coatings of the examples, together with a control coating of conventional MgO slurry, were applied to sheets of electric steel. Each was applied in weights of 0.008 and 0.015 oz./sq. ft. The sheets were heated to a temperature between 750° F. and 800° F. to drive off the water and each was inspected. Manual qualitative tests indicated that the separating medium coatings of the examples were superior in adherence to that of the control coating.

The sheets were then box-annealed at 2075° F. for twenty-four hours, and then scrubbed to remove any loose residue. Thereafter, Examples I and II were selected as representative for testing to determine the degree of electrical insulation of the coatings. The Franklin test was used (ASTM Test No. A344–52, Method 2) at 250 p.s.i. and room temperature. The results of this test are given in Table I below. After the Franklin test, the strips were cut into Epstein strips (3 cm. x 25 cm.) and tested for core loss and alternating-flux permeability (ASTM Test No. A346-58). These results also are tabulated in Table I below.

Table I

| Coating | Coating Weight, oz./sq. ft, of Surface | Franklin Test, 250 p.s.i. R.T., amp./sq. in. | Core Loss, Watts/lb., 15,000 B | Permeability, 15,000 B |
|---|---|---|---|---|
| MgO | 0.008 | 0.56 | 0.67 | 16,511 |
|  | 0.015 | 0.57 | 0.65 | 19,182 |
| Example I | 0.008 | 0.40 | 0.65 | 20,380 |
|  | 0.015 | 0.30 | 0.62 | 21,739 |
| Example II | 0.008 | 0.28 | 0.60 | 22,489 |
|  | 0.015 | 0.56 | 0.62 | 21,383 |

The tests above were performed on samples which were not core-plated. Application of such treatment, however, would cause a uniform increase in the insulation properties of the samples. The test results indicate that a separating-medium coating made according to this invention, in addition to having excellent adherence characteristics also has improved electrical insulation and magnetic properties.

While several forms of my invention have been described it will be apparent that other adaptations and modifications may be made without departing from the scope of the following claims.

I claim:

1. A separating-medium coating consisting essentially of from 3.0% to 10.5% of finely divided reactive grade MgO, from .03% to 1.5% of an aluminum bearing material selected from a group consisting of aluminum hydroxide, colloidal boehmite (AlO(OH)) alumina, aluminum acetate and mixtures thereof, and the remainder water to produce a slurry.

2. In the composition of claim 1 the provision of an effective amount up to 2.0% of acetic acid.

3. A separating-medium coating consisting essentially of from 3.0% to 10.5% of finely divided reactive grade MgO, from .03% to 1.5% of aluminum hydroxide, and the remainder water to produce a slurry.

4. A separating-medium coating consisting essentially of from 3.0% to 10.5% of finely divided reactive grade MgO, from .03% to 1.5% of colloidal boehmite (AlO(OH)) alumina, and the remainder water to produce a slurry.

5. In the composition of claim 3 the provision of an effective amount up to 2.0% of acetic acid.

6. In the composition of claim 4 the provision of an effective amount up to 2.0% of acetic acid.

7. A separating-medium coating consisting essentially of from 3.0% to 10.5% of finely divided reactive grade MgO, between .03% and 1.5% of aluminum acetate, and the remainder water to produce a slurry.

8. A method of preparing electrical steel strip and the like for box annealing and the like, said strip being capable of reacting with MgO to form a glass-like coating of iron-magnesium-silicate, comprising applying to said strip a separating-medium coating consisting essentially of from 3.0% to 10.5% of finely divided reactive grade MgO, from .03% to 1.5% of an aluminum bearing material selected from a group consisting of aluminum hydroxide, colloidal boehmite (AlO(OH)) alumina, aluminum acetate and mixtures thereof, and the remainder water to produce a slurry.

9. A method of preparing electrical steel strip and the like for box annealing and the like, said strip being capable of reacting with MgO to form a glass-like coating of iron-magnesium-silicate, comprising applying to said strip a separating-medium coating consisting essentially of from 3.0% to 10.5% of finely divided reactive grade MgO, from .03% to 1.5% of an aluminum bearing material selected from a group consisting of aluminum hydroxide, colloidal boehmite (AlO(OH)) alumina, and mixtures thereof, and the remainder water to produce a slurry.

10. The method of claim 9 in which an effective amount up to 2.0% of acetic acid is included in the separating medium coating to improve coating adherence.

References Cited in the file of this patent

UNITED STATES PATENTS

| | | |
|---|---|---|
| 2,229,642 | Davison et al. | Jan. 28, 1941 |
| 2,641,556 | Robinson | June 9, 1953 |
| 2,663,658 | Schurecht | Dec. 22, 1953 |
| 2,828,233 | Langworthy | Mar. 25, 1958 |
| 3,000,752 | Jackson et al. | Sept. 19, 1961 |
| 3,073,722 | Hoehn | Jan. 15, 1963 |